(12) United States Patent
Shi et al.

(10) Patent No.: US 10,635,402 B2
(45) Date of Patent: Apr. 28, 2020

(54) METHOD AND SYSTEM FOR RANDOM NUMBER GENERATION

(71) Applicant: NATIONAL UNIVERSITY OF SINGAPORE, Singapore (SG)

(72) Inventors: Yicheng Shi, Singapore (SG); Brenda Mei Yuen Chng, Singapore (SG); Christian Kurtsiefer, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 0 days.

(21) Appl. No.: 16/078,798

(22) PCT Filed: Mar. 1, 2017

(86) PCT No.: PCT/SG2017/050096
§ 371 (c)(1),
(2) Date: Aug. 22, 2018

(87) PCT Pub. No.: WO2017/151061
PCT Pub. Date: Sep. 8, 2017

(65) Prior Publication Data
US 2019/0220250 A1    Jul. 18, 2019

(30) Foreign Application Priority Data

Mar. 1, 2016    (SG) .......................... 10201601540Y (51) Int. Cl.
*G06F 7/58*    (2006.01)
(52) U.S. Cl.
CPC .............. *G06F 7/588* (2013.01); *G06F 7/58* (2013.01); *G06F 7/584* (2013.01)

(58) Field of Classification Search
CPC .................................. G06F 7/58; G06F 7/588
See application file for complete search history.

(56) References Cited

U.S. PATENT DOCUMENTS 6,745,217 B2    6/2004  Figotin
7,284,024 B1 *  10/2007 Trifonov ................ B82Y 10/00
                                                        708/3
(Continued)

FOREIGN PATENT DOCUMENTS

| CN | 103793198 A | 5/2014 |
|---|---|---|
| EP | 2940923 A1 | 11/2015 |
| JP | 2003243691 A | 8/2003 |

OTHER PUBLICATIONS

Abellán, C., et al. "Generation of fresh and pure random numbers for loophole-free bell tests" Phys. Rev. Lett., 115:250403, Dec. 2015.

(Continued)

*Primary Examiner* — Chuong D Ngo
(74) *Attorney, Agent, or Firm* — Volpe and Koenig, P.C.

(57) ABSTRACT

A method and system for random number generation. The method comprises the steps of exposing first and second photodetectors to the same mode of a first electromagnetic field in the presence of a mode in a vacuum state of a second electromagnetic field, such that an illumination of the first and second photodetectors is at least substantially balanced; and generating a random noise signal based on a photocurrent difference between the first and second photodetectors.

9 Claims, 5 Drawing Sheets

(56) References Cited

U.S. PATENT DOCUMENTS

2014/0337400 A1    11/2014   Chong
2015/0261502 A1*   9/2015   Sartor .................... G06F 7/588
                                                                 359/107

OTHER PUBLICATIONS

Abellán, C., et al. "Ultra-fast quantum randomness generation by accelerated phase diffusion in a pulsed laser diode" Optics Express, 22(2):1645, 2014.

Bachor, H., et al. "A guide to Experiments in Quantum Optics" 2nd Edition, Chapter 8, Quantum Noise: Basic measurements and techniques, 2004.

Bachor, H., et al. "The Quantum Laser Pointer and Other Applications of Squeezed Light", 2004.

Delaubert, V., et al. "TEM10 Homodyne Detection as an Optimal Small Displacement and Tilt Measurements Scheme" Jul. 20, 2006.

Fürst, M., et al. "High speed optical quantum random number generation" Optics Express, 18(12):13029, 2010.

Gabriel, C., et al. "A generator for unique quantum random numbers based on vacuum states" Nature Photon, 4, 711715 (2010).

Galton, F. "Dice for statistical experiments" Nature, 42, 1314 (1890).

Glauber, R.J. "Coherent and Incoherent States of the Radiation Field", Phys. Rev. 131, 2766-2788 (1963).

Jakeman, E., et al. "Optical homodyne detection" Advances in Physics 24, 349 (1975).

Jofre, M., et al. "True random numbers from amplified quantum vacuum" Optics Express, 19(21):20665, Oct. 2011.

Kanter, I., et al. "An optical ultrafast random bit generator" Nature Photon, 4, 5861 (2009).

Krawczyk, H. "Lfsr-based hashing and authentication" Advances in Cryptology, CRYPTO 94, 129139, 1994.

Metropolis, N. "The beginning of the monte carlo method. Los Alamos Science" 15:125-130, 1987.

Nie, Y., et al. "The generation of 68 Gbps quantum random number by measuring laser phase fluctuations" Review of Scientific Instruments, 86(6):063105, Jun. 2015.

Nie, Y., et al. "Practical and fast quantum random number generation based on photon arrival time relative to external reference" Applied Physics Letters 104(5):051110, Feb. 2014.

Qi, Bing, et al. "High-speed quantum random number generation by measuring phase noise of a single-mode laser" Opt. Lett., 35(3):312, Jan. 2010.

Ren, M., et al. "Quantum random-number generator based on a photon-number-resolving detector" Physical Review A, 83(2):023820, Feb. 2011.

Sanguinetti, B., et al. "Quantum random number generation on a mobile phone" Phys. Rev. X, 4:031056, Sep. 2014.

Shen, Y., et al. "Practical quantum random number generator based on measuring the shot noise of vacuum states" Physical Review A, 81(6):063814, Jun. 2010.

Shi, Y., et al. "Random numbers from vacuum fluctuations" Applied Physics Letters, 109(4):041101, Jul. 2016.

Shi, Y., et al. "Random numbers from vacuum fluctuations" Feb. 29, 2016.

Stipcevic, M., et al. "Quantum random number generator based on photonic emission in semiconductors" Rev. Sci. Instrum., 78:045104, 2007.

Symul, T., et al. "Real time demonstration of high bitrate quantum random number generation with coherent laser light" Applied Physics Letters, 98(23):—, 2011.

Treps, N. "Surpassing the Standard Quantum Limit for Optical Imaging Using Non-Classical Multimode Light" 2002.

Wahl. M., et al. "An ul-trafast quantum random number generator with provably bounded output bias based on photon arrival time measurements" Applied Physics Letters, 98(17):171105, 2011.

Wayne, et al. "Photon arrival time quantum random number generation" Journal of Modern Optics, 56(4):516-522, 2009.

Wayne, M., et al. "Low-bias high-speed quantum random number generator via shaped optical pulses" Opt. Express, 18(9):9351-9357, Apr. 2010.

Williams, C. R.S., et al. "Fast physical random number generator using amplified spontaneous emission" Optics Express, 18(23):23584, Oct. 2010.

Xu, F., et al. "Ultrafast quantum random number generation based on quantum phase fluctuations" Optics Express, 20(11):12366, May 2012.

Yuan, Z. L., et al. "Robust random number generation using steady-state emission of gain-switched laser diodes" Applied Physics Letters, 104(26):261112, Jun. 2014.

Yuen, H.P., et al. "Noise in homodyne and heterodyne detection" Optics Letters 8, 177-179 (1983).

Zhou, H. et al. "Randomness generation based on spontaneous emissions of lasers" Physical Review A, 91(6):062316, Jun. 2015.

\* cited by examiner

METHOD AND SYSTEM FOR RANDOM NUMBER GENERATION

FIELD OF INVENTION

The present invention relates broadly to a method and system for random number generation.

BACKGROUND

Generating high quality and trusted random numbers is an essential task in various cryptographic schemes and many other applications such as Monte Carlo simulations [1] and various algorithms utilizing random numbers. Algorithmically generated pseudo-random numbers are available at very high rates and can be easily implemented in software, but they are deterministic in nature and therefore are not suitable for cryptographic purposes, and may be problematic for some Monte-Carlo simulations as well as other applications, e.g. games.

As an alternative, hardware random number generators have been used [2, 3]. They measure noisy physical processes and convert the outcome into random numbers. Since it is impossible to predict the outcome of such measurements, these physically generated random numbers are more trusted compared to pseudo-random numbers. Quantum random number generators (QRNG) are a class of hardware random number generators whose source of randomness is the outcome of measurements of a quantum noise source.

Early implementations of QRNGs made use of the decay statistics of radioactive nuclei [4, 5]. A number of more recent implementations using quantum optical measurements have been reported. These include measuring photon number statistics [6-12], scattering events of single photons by a beam splitter [13] and amplified spontaneous emission of a fiber amplifier [14]. QRNGs based on measuring the intensity [15, 16] and phase noise [17-24] of different light sources have also been reported.

QRNG implementations based on measuring the vacuum fluctuations of the electromagnetic field have also been reported in [25-28]. Such measurements are known for their high bandwidth. However, the reported QRNG implementations based on measuring vacuum fluctuations of the electromagnetic field have commercial implementation problems due to complexity of the alignment of optical elements and issues in manufacturability.

Embodiments of the present invention provide an alternative method and system for random number generation.

SUMMARY

In accordance with a first aspect of the present invention, there is provided a method of random number generation, the method comprising the steps of exposing first and second photodetectors to the same mode of a first electromagnetic field in the presence of a mode in a vacuum state of a second electromagnetic field, such that an illumination of the first and second photodetectors is at least substantially balanced; and generating a random noise signal based on a photocurrent difference between the first and second photodetectors.

In accordance with a second aspect of the present invention, there is provided a system for random number generation comprising first and second photodetectors; a source for generating a first electromagnetic field; and means for generating the random noise signal based on a photocurrent difference between the first and second photodetectors; wherein the first and second photodetectors and the source are disposed such that the first and second photodetectors are exposable to the same mode of the first electromagnetic field in the presence of a mode in a vacuum state of a second electromagnetic field and such that an illumination of the first and second photodetectors is at least substantially balanced.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Example embodiments described herein provide a simplified optical setup of a homodyne detector for QRNG implementation based on measuring the vacuum fluctuations of the electromagnetic field, advantageously down to only a laser diode and two photodiodes without using light splitting components in a preferred embodiment. Combined with an efficient randomness extractor in example embodiments, generation of unbiased and uncorrelated stream of random bits at a high rate can be achieved, but with a much simpler optical setup.

In the example embodiments, a quantum random number generator based on a balanced homodyne measurement of vacuum fluctuations of the electromagnetic field is implemented. Wave front splitting of the local oscillator is advantageously used in example embodiments instead of amplitude splitting by way of a beam splitter in order to simplify the optical setup. The digitized noise signal is processed in example embodiments with a fast randomness extraction scheme based on a linear feedback shift register. The random bit stream is continuously read in a computer at a rate of about 480 Mbit/s in an example embodiment and passes an extended test suite for random numbers.

Figure 1:
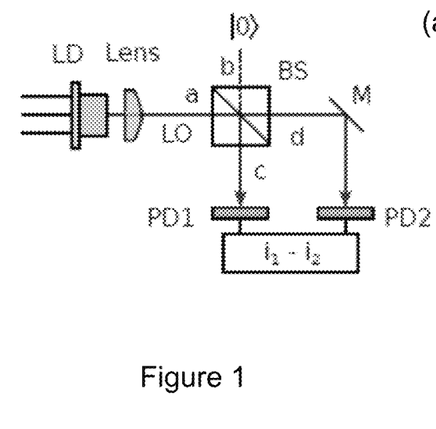
FIG. 1 shows the schematic of a conventional balanced homodyne detector.

Generally, the QRNG based on measuring vacuum fluctuations of the electromagnetic field uses a balanced homodyne detector. A conventional setup consists of a laser diode (LD) as a local oscillator, a 50:50 beam splitter (BS) (or an optical system emulating it, e.g. a combination of wave plates and polarizing beam splitters) and two photodiodes (PD1, PD2). A collimation element (e.g. a lens) and eventually other optical components like mirrors are also used to steer and guide the laser beam. FIG. 1 shows the schematic of a conventional balanced homodyne detector. The local oscillator (LO) in mode a enters the beam splitter (BS) and is directed onto two photodiodes (PD1, PD2) and the photocurrent difference is measured. This setup maps fluctuations of electrical field in mode b to the photocurrent difference i1-i2. When probing the vacuum fluctuations of EM fields, the input mode b of the beam splitter (BS) is kept empty (i.e. mode b is at |0>).

As is understood by a person skilled in the art, a core requirement for a balanced homodyne detection is the superposition of modes a and b at the beam splitter (BS), which is governed by the following matrix:

$$E_c = \frac{1}{\sqrt{2}}(E_a + E_b) \quad (1)$$

$$E_d = \frac{1}{\sqrt{2}}(E_a - E_b) \text{ or } \begin{pmatrix} c \\ d \end{pmatrix} = M\begin{pmatrix} a \\ b \end{pmatrix} \text{ with}$$

$$M = \frac{1}{\sqrt{2}}\begin{pmatrix} 1 & 1 \\ -1 & 1 \end{pmatrix}$$

where $E_{a,b,c,d}$ represents the oscillating electrical fields in modes a, b, c, d.

There is a certain freedom for the phases of the beam splitter matrix, but a necessary condition is that the off-diagonal entries have a phase shift of 180 degrees with respect to each other. In the conventional arrangement this is ensured by all physical implementations of amplitude beam splitters due to boundary conditions of the electromagnetic field at the interfaces in the physical beam splitter.

The idea behind the optical homodyning technique is that the photocurrent difference can be proportional to the electromagnetic field in mode b. The photocurrent difference $\Delta i$ is given by $$\Delta i = i_c - i_d = \text{const} \cdot (\langle E_c^2 \rangle - \langle E_d^2 \rangle) \quad (2)$$

where $\langle E_{c,d}^2 \rangle$ are the quantum physical expectation values of the squared electric field operators. Because $$\langle \hat{E}_{c,d}^2 \rangle = \frac{1}{2}\langle \hat{E}_a^2 + \hat{E}_b^2 \pm (\hat{E}_a\hat{E}_b + \hat{E}_b\hat{E}_a)\rangle = \frac{1}{2}[\langle \hat{E}_a^2\rangle + \langle \hat{E}_b^2\rangle \pm 2\hat{E}_a\langle 0_b|E_b|0_b\rangle] \quad (3)$$

where $E_a$ is the classical local oscillator amplitude, the homodyning photocurrent difference is $$\Delta i = 2\text{const} \cdot \langle 0_b|E_b|0_b\rangle \quad (4)$$

i.e, proportional to the expectation value of the electrical field of mode b in the vacuum state.

In the conventional arrangement, modes a and b need to be aligned such that their respective fractions have a complete overlap at the outputs of the beam splitter (BS). The overlap of the two modes is not only restricted to their transverse profile, but also their longitudinal mode structure, which is essentially their wave number or frequency. Then, the photodiode current difference $\Delta i$ only measures the electromagnetic field amplitude of a mode b that is compatible with the geometry and frequency of the local oscillator mode a.

Figure 2:
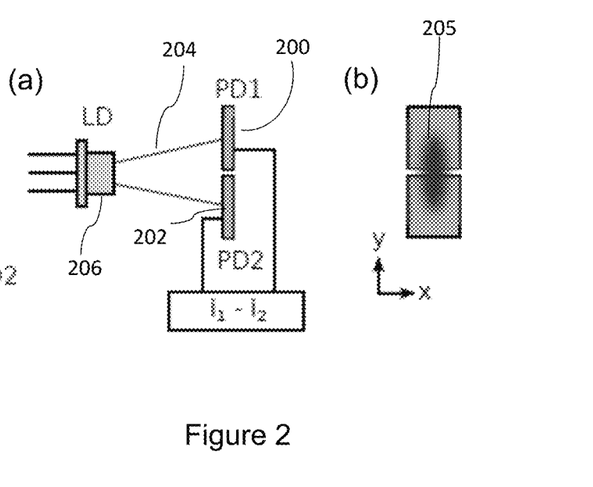
FIG. 2(a) shows the schematic of the simplified setup according to an example embodiment.
FIG. 2(b) shows a detail of the schematic of the simplified setup according to an example embodiment, illustrating at least substantial balancing of illumination of the photodiodes.

According to an example embodiment of the present invention, the setup of the conventional balanced homodyne detector is advantageously simplified by using a different mode decomposition of the local oscillator, thus replacing the beam splitter matrix in equation (1). FIGS. 2(a) and (b) show the simplified setup according to an example embodiment. A pair of photodiodes 200, 202 are placed adjacent to each other and are directly exposed to the laser beam 204, each photodiode 200, 202 receiving approximately half of the laser beam 204 spot. The optical mode 205 from the laser diode 206 is typically of elliptical transverse profile in its transverse direction in an example embodiment, with opening angles between 10 and 30 degrees, and an aspect ratio of 1:2 to 1:5, by way of example, not limitation. Its electrical field amplitude can be approximately written as:

$$E_L(x,t) = E_0 g(x,t) = (\mathbb{C}e^{-i\omega t})e^{-x^2/w_x^2} \cdot e^{-y^2/w_y^2}, \quad (5)$$

where c is a polarization vector, $E_0$ a global field amplitude, x and y the transverse spatial coordinates in the photodetector plane, and $w_x$, $w_y$ the Gaussian beam parameters in the two transverse directions x and y.

It was found by the inventors that by introducing a second field $E_V(x,t) = E_0 h(x,t)$ characterized by a mode function $h(x,t)$ that has almost the same structure as the laser mode $g(x,t)$ except that it has an additional phase step of 180 degrees in the lower plane of the photodiode arrangement:

$$h(x,t) = g(x,t) \cdot \begin{Bmatrix} +1 \text{ for } y > 0 \\ -1 \text{ for } y < 0 \end{Bmatrix} \quad (6)$$

the measured homodyning photocurrent difference in the arrangement in FIGS. 2(a) and (b) will be proportional to the expectation value of the second electrical field with the mode function h(x,t).

By way of background, aspects of mode decomposition will be reviewed next. The electromagnetic field E(x,t) at any point in space characterized by a position vector x at time t can be described as a linear superposition of contributions from different modes:

$$E(x,t) = \Sigma a_k g_k(x,t), \quad (7)$$

where $a_k$ is the amplitude of the mode with index k, and $g_k(x,t)$ is the field distribution of mode k in space and time. The summation can be over a discrete or continuous mode index k. This is done because then, the equation of motion for the electromagnetic field can become particularly simple for a proper mode decomposition, and is equivalent to a simple harmonic oscillator. As an example, the most common mode decomposition in free space uses a wave vector k as a mode index, and the field mode functions $g_k(x,t)$ become plane waves, with a harmonically oscillating evolution in time according to the characteristic frequency $\omega_k$ of mode k: $g_k(x,t) = \in_k e^{ik \cdot x} \cdot e^{-i\omega_k t}$ with polarization vector $\in_k$ for mode k.

However, plane waves are not the only set of modes that can be used to synthesize an arbitrary electromagnetic field. Often, a decomposition in Gaussian beam modes is used when working with laser-like beams, because these modes provide an electromagnetic field distribution that is approximately a plane wave in the main propagation direction of the beam, and has a Gaussian envelope in the transverse direction. Such modes are often referred to as "Gaussian beams", and form the basis of most work in traditional quantum optics. Apart from a simple Gaussian beam profile (often referred to as a TEM00 mode), there are higher order modes, which typically have a number of zeroes in the transverse field distribution, either arranged in a Cartesian grid (Hermite-Gauss modes) or in a radial/angular way (Gauss-Laguerre modes). Yet another mode decomposition can e.g. be found in hollow rectangular wave guides in the microwave domain, where the transverse modes are characterized by sine functions matching the boundary conditions at the walls, and a plane wave in along the wave guide axis. A useful property of a mode decomposition of the electromagnetic field is that the mode functions form an orthogonal set that allows to express every field configuration as a linear superposition of the normal modes. Orthogonality between two modes g_k1,g_k2 is typically evaluated as a vanishing scalar product, integrated over the whole space:

$$\langle g\_k1, g\_k2 \rangle := \int g(x,t) \cdot h(x,t) d^3x = 0 \quad (8)$$

Orthogonal modes evolve in time completely independently.

Each of these electromagnetic modes behaves like a harmonic oscillator. At low amplitudes of the electromagnetic field, the field has to be treated in the formalism of quantum physics. As each of the electromagnetic modes behaves like a harmonic oscillator, the electromagnetic field shows the same properties as a quantum harmonic oscillator [32]. Specifically, the state of the lowest energy of an oscillator (ground state) has a non-vanishing amplitude of the electromagnetic field. The amplitude of the electromagnetic field follows a Gaussian probability distribution, and they are referred to as vacuum fluctuations of the electromagnetic field [33]. These fluctuations of the electromagnetic field can be used as the root source of randomness in the implementation of a quantum random number generator according to example embodiments, using the homodyne detection technique [34].

Returning now to the arrangement shown in FIGS. 2(a) and (b) according to an example embodiment, the mode function h(x,t) of the second electric field (equation (6)) is orthogonal to the mode function g(x,t) of the laser beam 204:

$$(g,h) := \int g(x,t) \cdot h(x,t) d^3x = 0 \quad (9)$$

That is, they evolve independently, and are described as independent harmonic oscillators because they correspond to orthogonal modes. Now the entire field that ends up on photodiode 200 in the upper plane can be written as $$E_1(x, t) = \frac{1}{2}(E_L(x, t) + E_V(x, t)) = E_L(x, t) \cdot \begin{cases} 1 \text{ for } y > 0, \\ 0 \text{ for } y < 0 \end{cases} \quad (10)$$

Similarly, the field on the lower photodiode 202 can be written as $$E_2(x, t) = \frac{1}{2}(E_L(x, t) - E_V(x, t)) = E_L(x, t) \cdot \begin{cases} 0 \text{ for } y > 0, \\ 1 \text{ for } y < 0 \end{cases} \quad (11)$$

Therefore, the electrical field modes ending up on the two photodiodes 200, 202 can be written as a superposition of mode functions g(x,t) and h(x,t) which reproduce the beam splitter relations with the correct phase shift (compare equation (1)). Remembering the selectivity of the homodyning principle, it follows that the difference in photocurrents between the adjacent photodiodes 200, 202 measures the electrical field in a mode characterized by the mode function h(x,t), provided that the mode h(x,t) is in the so-called vacuum state, which classically corresponds to a field with zero amplitude. In the absence of any other light field other than the local oscillator mode (i.e., the laser field), this is advantageously automatically ensured, such that the first and second photodetectors 200, 202 are exposed to the local oscillator mode in the presence of the mode h(x,t) in the so-called vacuum state.

In contrast to a conventional homodyne detector based on amplitude splitting of fields through a beam splitter, the example embodiments described above with reference to FIGS. 2(a) and (b) uses the splitting of the wave front of the laser beam 204 and thus preferably eliminates the usage of beam splitting components. The setup is thus advantageously significantly simplified compared to conventional QRNG implementation based on measuring the vacuum fluctuations of the electromagnetic field and the non-trivial alignment procedures can preferably be avoided.

Figure 3:
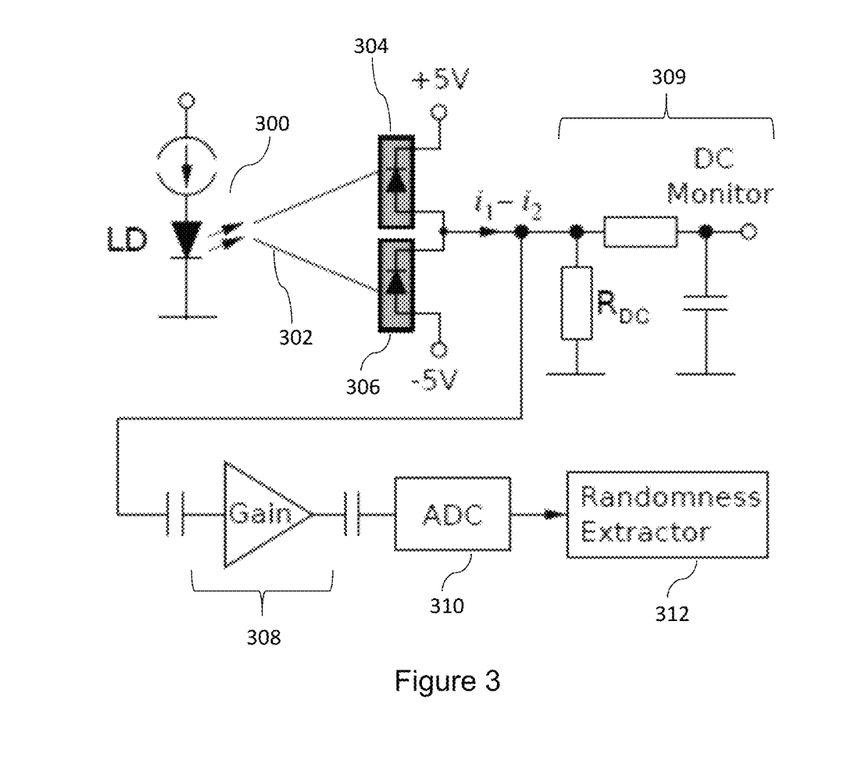
FIG. 3 shows the schematic of the balanced homodyne detection setup of a QRNG implementation based on measuring the vacuum fluctuations of the electromagnetic field according to an example embodiment.

FIG. 3 schematically shows the balanced homodyne detection setup of a QRNG implementation based on measuring the vacuum fluctuations of the electromagnetic field according to an example embodiment. A continuous wave laser 300 (wavelength 780 nm) is used as the local oscillator for the vacuum fluctuations measurement, according to an example embodiment. The beam 302 from the laser diode 300 impinges directly onto a pair of photodiodes 304, 306. The sensitive areas of the two photodiodes 304, 306 are two 0.6×0.6 mm squares and are placed next to each other with a 1 mm gap in between. The laser diode 300 casts an elliptical beam spot at the sensitive areas of the photodiodes 304, 306 of about 2.5 mm long and 0.7 mm wide, which covers the respective sensitive areas of the two photodiodes 304, 306.

A fraction of the optical power is received by the two photodiodes 304, 306. By adjusting the position of the beam 302 spot, the optical power received by the two diodes 304, 306 can be balanced. The fluctuations of the photocurrent difference Δ(i1−i2) is amplified by a transimpedance amplifier (Analog Devices AD8015) followed by two wideband RF differential amplifiers (Analog Devices AD8351). The entire amplifier chain 308 has a calculated effective transimpedance of Reff~1M. A DC monitoring circuit 309 is provided for, for example, facilitating balancing measurements during alignment.

Figure 4:
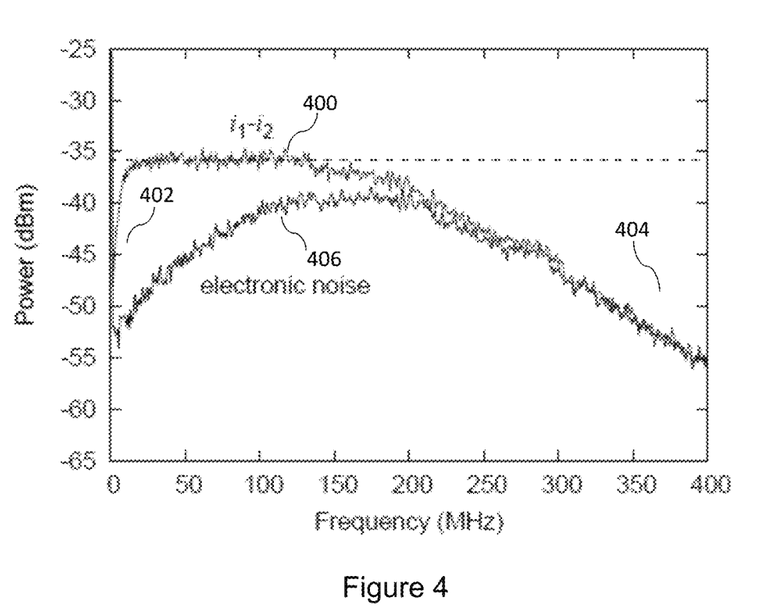
FIG. 4 shows the measured total noise output of a balanced homodyne detection setup of a QRNG implementation based on measuring the vacuum fluctuations of the electromagnetic field according to an example embodiment, which has a relative flat power density range from about 10 MHz to 150 MHz.

FIG. 4 shows the measured total noise output (400) which has a relative flat power density range from about 10 MHz to 150 MHz. The lower end 402 of the band is set by the AC coupling capacitors in the gain block 308 (FIG. 3) while the higher end 404 is determined by the cut-off frequency of the amplifiers in the gain block 308 (FIG. 3). As a comparison, the electronic noise (406) is measured with the laser diode 300 (FIG. 2) switched off. The signal to noise ratio is over 10 dB at lower frequencies (0-50 MHz) and around 5 dB at higher frequencies (50-100 MHz) and we conclude that the total noise is dominated by quantum fluctuations in at least that frequency range.

Figure 5:
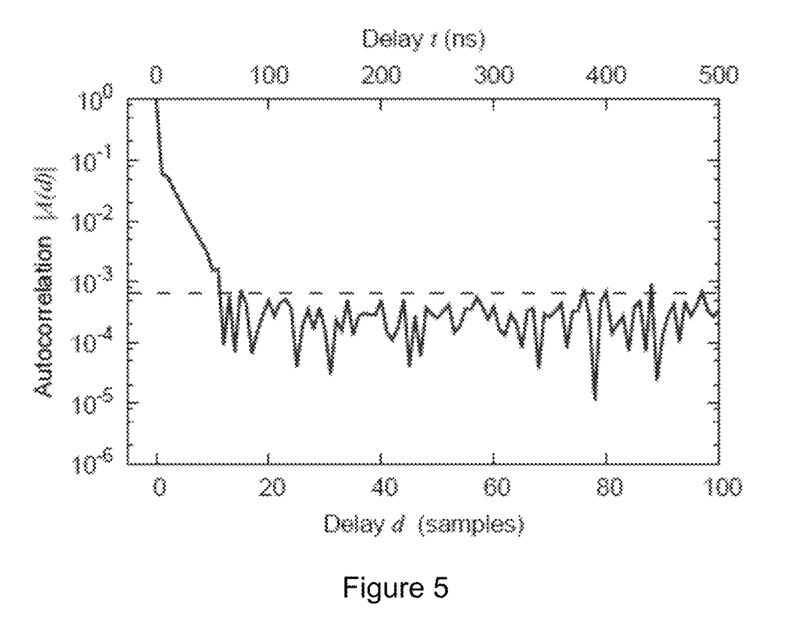
FIG. 5 shows the normalized autocorrelation of the noise output of a balanced homodyne detection setup of a QRNG implementation based on measuring the vacuum fluctuations of the electromagnetic field according to an example embodiment over $10^7$ samples.

Returning to FIG. 3, the amplified noise signal is digitized into signed 12 bit words (by way of example only, not limitation) at a sampling rate of 200 MHz with an analog to digital converter 310 (ADC). The normalized autocorrelation evaluated over 10^7 samples is shown in FIG. 5. The autocorrelation measured up to a delay of d=100 is on the order of $10^{-4}$ which is below the 2σ confidence level. Residual correlation is observed for d<10 and is a consequence of the finite bandwidth of the noise signal (150 MHz in the example embodiment) and the high sampling rate of the ADC 319 (200 MHz). The output from the ADC 310 is input to a randomness extractor 312.

Figure 6:
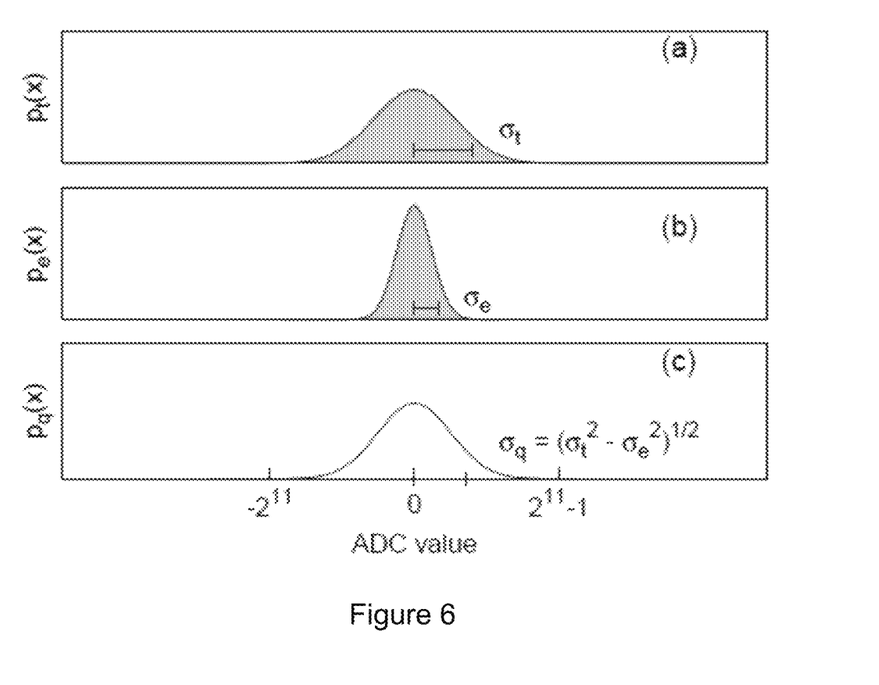
FIG. 6(a) shows the probability distribution of the measured total noise of a balanced homodyne detection setup of a QRNG implementation based on measuring the vacuum fluctuations of the electromagnetic field according to an example embodiment, with variance $\sigma_t^2(a)$.
FIG. 6(b) shows the probability distribution of the electronic noise of a balanced homodyne detection setup of a QRNG implementation based on measuring the vacuum fluctuations of the electromagnetic field according to an example embodiment, with variance $\sigma_e^2$.
FIG. 6(c) shows the probability distribution of the estimated quantum noise a balanced homodyne detection setup of a QRNG implementation based on measuring the vacuum fluctuations of the electromagnetic field according to an example embodiment, with variance $\sigma_q^2$.

FIG. 6(a) shows the probability distribution of the measured total noise with variance $\sigma_t^2$. FIG. 6(b) shows the probability distribution of the electronic noise with variance $\sigma_e^2$. FIG. 6(c) shows the probability distribution of the estimated quantum noise with variance $\sigma_q^2$. The filled areas in FIGS. 6(a), (b) show the actual measurements over 107 samples, the solid lines fit to Gaussian distributions.

The entropy in the raw data was estimated for determining the amount of extractable randomness from the QRNG according to an example embodiment. Two different definitions of entropy are used here. An upper bound of randomness is given by the Shannon entropy, and the min-entropy is computed to set a lower bound.

For the setup according to an example embodiment, the same assumptions made in [28] were followed, which assumes that the measured total noise signal $X_t=X_q+X_e$ is the sum of independent random variables $X_q$ for the quantum noise, and $X_e$ for the electronic noise. The three variables $X_q$, $X_e$ and $X_t$ are assumed to follow Gaussian distributions and take discrete values between $-2^{11}$ and $2^{11}-1$.

Considering the worst case scenario that an adversary has full knowledge of the electronic noise (compare 406 in FIG. 4), the conditional Shannon entropy in this case is $$H(X_t|X_e)=H(X_q+X_e|X_e)=H(X_q|X_e)=H(X_q) \quad (12)$$

A variance of $\sigma_q^2=\sigma_t^2-\sigma_e^2 \sim 531.6^2$ is calculated for $X_q$ (compare FIG. 6(c)). For such a Gaussian distribution with $\sigma_q \gg 1$, the Shannon entropy can be computed as $$H_S(X_q) = \sum_{x=-2^{11}}^{2^{11}-1} -p_q(x)\log_2 p_q(x) \quad (13)$$
$$\approx \int_{-\infty}^{+\infty} -f(x)\log_2 f(x)dx = \log_2(\sqrt{2\pi e}\,\sigma_q)$$
$$\approx 11.1 \text{ bits}$$

The min-entropy of the quantum noise $X_q$ is computed as $$H_\infty(X_q) = -\log_2(\max[p_q(x)]) \quad (14)$$
$$\approx \log_2(\sqrt{2\pi}\,\sigma_q)$$
$$\approx 10.38 \text{ bits}$$

The Shannon entropy $H_S(X_q)$ and min-entropy $H_\infty(X_q)$ set up the upper and lower bound of extractable randomness, respectively. A randomness extractor based on a Linear Feedback Shift Register (LFSR), which has been reported in [28] was used. The extractor is equivalent to multiplying an input stream of 63 bits to a 63×63 Toeplitz matrix generated from a LFSR and is shown to be a valid hashing function [29]. The low complexity of this extractor allows it to be easily implemented either in high speed or low power technology. This scheme can be parallelized using 126 register cells, capable of receiving up to 63 injected raw bits per clock cycle to even further speed up the process.

Figure 7:
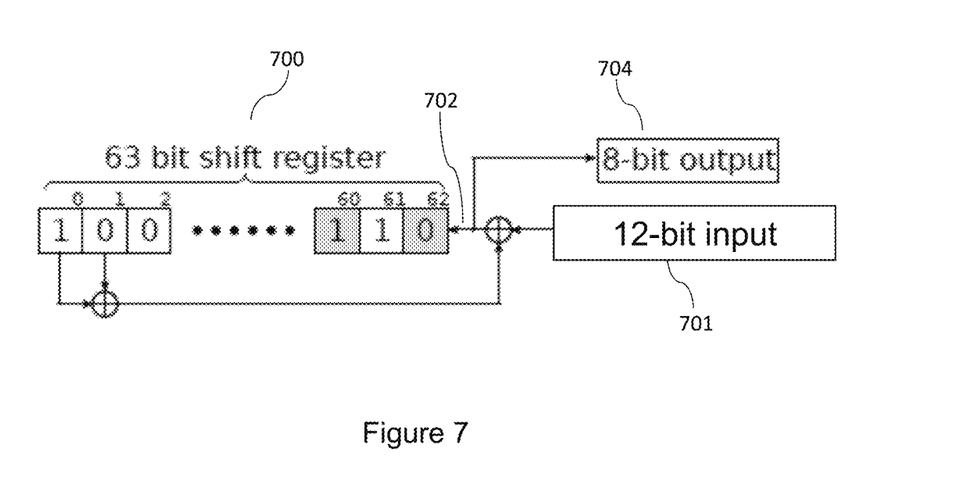
FIG. 7 shows the schematic of a randomness extractor based on a Linear Feedback Shift Register (LFSR) for use in an example embodiment.

Briefly, with reference to FIG. 7, 12 bits from each ADC 310 (FIG. 3) output word are first padded with 4 "0"s, resulting in a 16-bit word 701 which is then serially injected into a randomness extractor in the form of LFSR 700 at input 702. Only 8 bits (at positions 62, 60, 48 after the injection) are extracted at output 704 in a parallelized topology. This is equivalent to a privacy amplification process, and preferably ensures that no residual correlations due to the non-uniform input distribution or any classical noise deriving e.g. from the electronic circuitry responsible for the conversion of the photocurrent difference to a digital output, that may be known to an adversary are present in the output stream, because the extraction ratio of 50% is lower than the 10.38/12~86% allowed by the min entropy (compare equation (13)). It is noted that the selection of the extraction ratio can also advantageously buffer some aging of the optical components like the laser, or to some extent external noise sources which could be under control of an adversary.

The statistical test suite from NIST [30], and the "Dieharder" randomness test battery [31] was applied to evaluate the quality of the extracted random numbers according to an example embodiment. The RNG output according to an example embodiment passed both tests consistently when evaluated over a sample of 400 Gigabit in the sense that occasional weak outcomes of some tests do not repeat.

The evaluated example embodiment has an output rate of about 480 Mbit/s of uniformly distributed random bits, with the digitizer unit sampling at 200 MHz and randomness extraction ratio of 66%, noting that this is limited by the speed of the data transmission protocol (USB2.0) used in the evaluated example embodiment.

With the mode decomposition method described in the example embodiments above, the beam geometry of a vacuum mode homodyning setup for random number generation can advantageously be simplified to only a laser diode with its divergent optical mode, and two photodiodes located next to each other. In one embodiment, a split photodiode can be used, which contains two photodiode elements with a very small gap on a single silicon die. Such single die photodiodes are readily available and are e.g. used in the optical readout of an atomic force microscope, or in various beam steering schemes. However, any arrangement of adjacent photodiodes may be used in different embodiments.

The elliptical spatial laser mode illuminates the two photodiodes in a way that they receive approximately the same optical power to at least substantially balance the photodiode currents from the respective photodiodes for the homodyning scheme. The beam splitter is not necessary anymore, which significantly simplifies the alignment and the complexity of the physics package.

Figure 8:
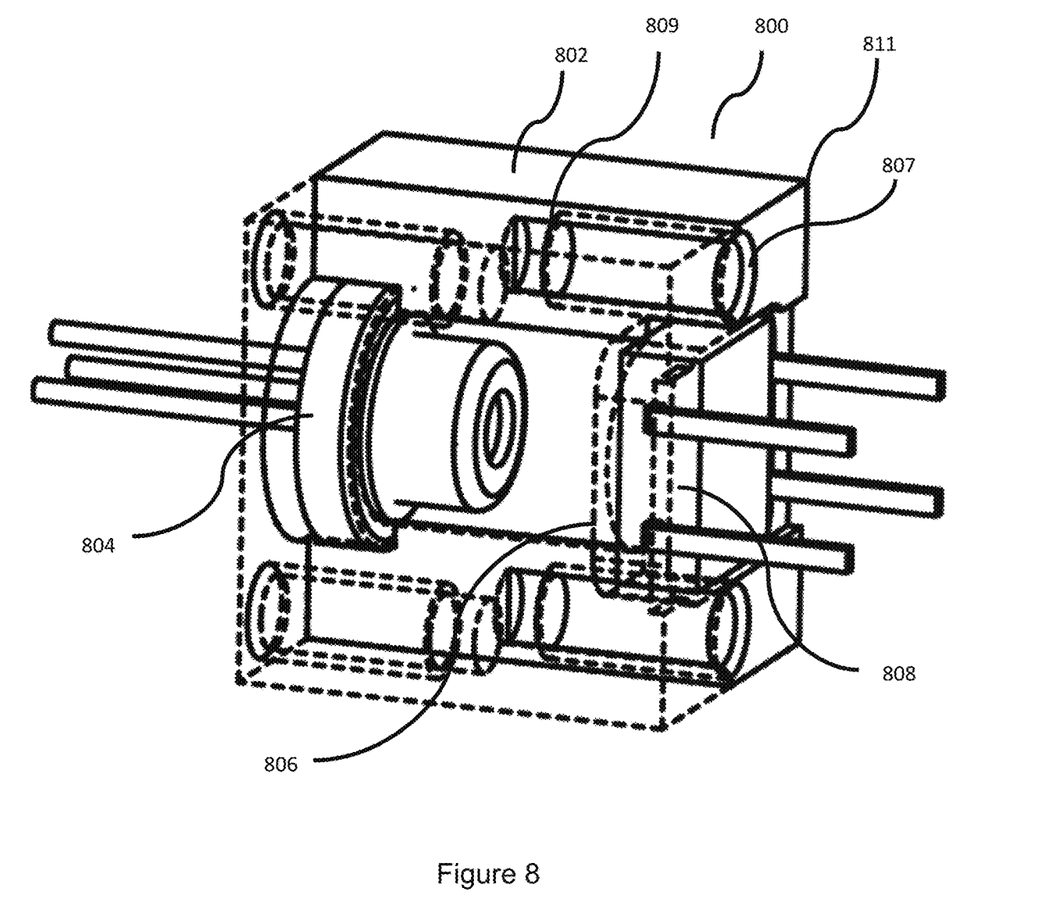
FIG. 8 shows a line drawing of a device implementation according to an example embodiment.

For example, for a choice of the overall photodiode sensitive area size (around 1 to 2 mm in example embodiments) and distance between the photodiodes (approximately 100 micrometer for a typical single die device in an example embodiment), an alignment accuracy of 100 micrometer is found to be sufficient to balance the photodiode currents to within a few percent. This obsoletes beam steering components, or an arrangement of a polarization rotator and a polarizing beam splitter. A device 800 implementation according to an example embodiment is shown in FIG. 8. The only mechanical component is a simple spacer 802 between the laser diode 804 and the split photodiode die 806. The overall size of the physical package of the device 800 based on commercially available components is about 1 cm³. It is noted that, if desired, an element such as a shim or similar may be placed under the spacer 802 for adjustment of a distance between the laser diode 804 and the photodiode die 806. In this embodiment, a small lateral translation of the photodiode die 806 is allowed by the size of the holes e.g. 807 in the circuit board 811 which the spacer 802 is sitting on. Two screws (not shown) secure the spacer 802 to the circuit board 811 and are received in the tapped holes e.g. 809. Furthermore, depending on the alignment accuracy of the laser diode 804 chip in the laser diode 804 housing, the angular orientation of the laser diode 804 with respect of the main beam propagation direction may also be used to balance the photocurrents in an alignment step during assembly of the optics package in an example embodiment.

The spacer 802 with the laser diode 804 and the split photodiode die 806 in place also function to form a light tight housing or package, such that the split photodiode 808 is exposed to the same mode of the electromagnetic field from the laser diode 804 in the presence of the mode in a vacuum state of the second electromagnetic field.

An additional simplification according to another example embodiment can be achieved by using bare chips for the laser and photodiode(s), respectively, and integrating the device assembly in a separate housing.

It is noted that the physical size of the optics package in example embodiments is in any event typically significantly smaller than the necessary preamplifier for the photodiode currents used for evaluation, which was built with commercially available components. However, in different embodiments the electronics can be provided on a dedicated chip, which in turn may also be integrated into a single package together with the optical components.

The simplified optical setup according to example embodiments does not require any beam steering elements as long as sufficient balancing between the illumination of the two photodiodes can be achieved. The degree of balancing for random number generation is related to the suppression of "classical" noise in the measured signal, as was described in more detail above. This classical noise (which, from a quantum physics perspective, may possibly be caused by willful interference of a third party, compromising the security of the randomness) will partially reduce the amount of randomness in the extracted photocurrent difference signal. However, this reduction in randomness content in the homodyning signal scales at worst linearly with the imbalance of the light distribution, i.e., an imbalance of e.g. 5% between the two photodiodes reduces the randomness only slightly. The mechanical tolerances of a standard manufacturing process, and very simple alignment can readily keep the optical imbalance to below 5%. Furthermore, the reduced randomness due to the manufacturing tolerances can be taken care of by an increased security parameter in the randomness extraction procedure, as was also described in more detail above, and is essentially immaterial to the quality of the random numbers generated according to example embodiments.

Figure 9:
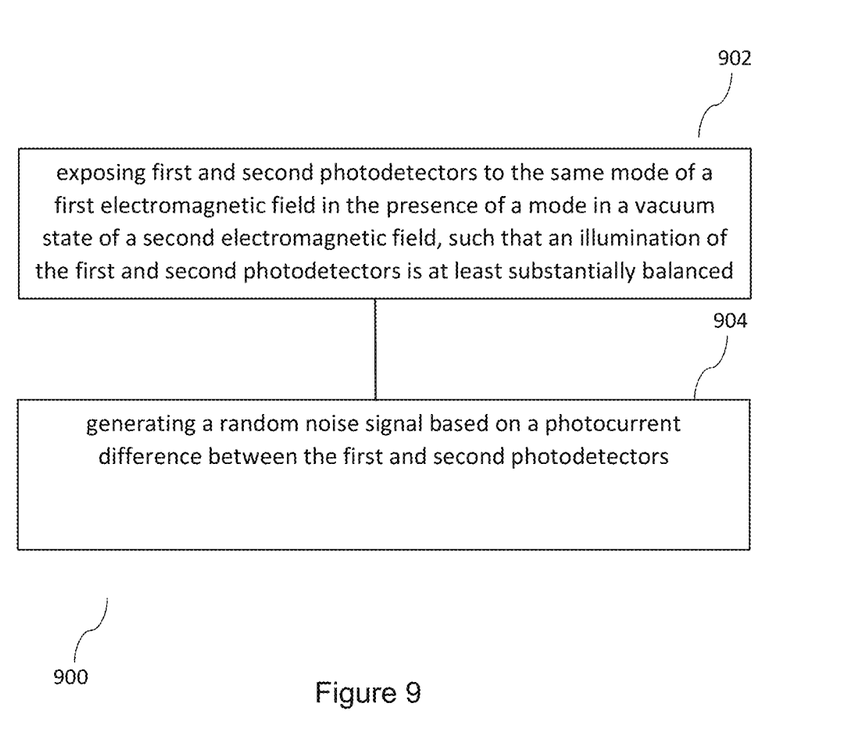
FIG. 9 shows a flow chart illustrating a method of random number generation according to an example embodiment.

FIG. 9 shows a flow chart 900 illustrating a method of random number generation according to an example embodiment. At step 902, first and second photodetectors are exposed to the same mode of a first electromagnetic field in the presence of a mode in a vacuum state of a second electromagnetic field, such that an illumination of the first and second photodetectors is at least substantially balanced. At step 904, a random noise signal is generated based on a photocurrent difference between the first and second photodetectors.

Generating the random noise signal may comprise performing an analogue to digital conversion of the photocurrent difference. Generating the random noise signal may further comprise applying a randomness extraction process to the digitally converted photocurrent difference. The method may further comprise selecting an extraction ratio of the randomness extraction process to account for a deviation from an ideal balance of the illumination of the first and second photodetectors and a noise contribution due to noise sources not of quantum origin.

In one embodiment, a system for random number generation is provided. The system comprises first and second photodetectors; a source for generating a first electromagnetic field; and means for generating a random noise signal based on a photocurrent difference between the first and second photodetectors; wherein the first and second photodetectors and the source are disposed such that the first and second photodetectors are exposable to the same mode of the first electromagnetic field in the presence of a mode in a vacuum state of a second electromagnetic field and such that an illumination of the first and second photodetectors is at least substantially balanced.

The means for generating the random noise signal may be configured for performing an analogue to digital conversion of the photocurrent difference. The means for generating the random noise signal may further be configured for applying a randomness extraction process to the digitally converted photocurrent difference. The means for generating the random noise signal may be configured for selecting an extraction ratio of the randomness extraction process to account for a deviation from an ideal balance of the illumination of the first and second photodetectors and a noise contribution due to noise sources not of quantum origin. The first and second photodetectors and the source may be disposed in a light tight housing or package.

Embodiments of the present invention provide a compact QRNG implementation based on measuring the vacuum fluctuations of the electromagnetic field. It is noted that the random number generation rate can be greatly increased in different embodiments, for example by extending the bandwidth of the photodiodes, amplifiers, and digitizer devices. Embodiments of the present invention provide a random number generation system and scheme by measuring the vacuum fluctuations of the electromagnetic field. By using wave front splitting instead of amplitude splitting, the usage of any beam splitting optics can advantageously be eliminated in example embodiments. Based on estimating the amount of usable entropy from quantum noise and using an efficient randomness extractor based on a linear feedback shift register according to an evaluated example embodiment, uniformly distributed random numbers can be generated at a high rate from a fundamentally unpredictable quantum measurement.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features, in particular any combination of features in the patent claims, even if the feature or combination of features is not explicitly specified in the patent claims or the present embodiments.

REFERENCES

[1] N. Metropolis. The beginning of the monte carlo method. Los Alamos Science, 15:125-130, 1987.

[2] Francis Galton. Dice for statistical experiments. Nature, 42, 1314 (1890).
[3] Benjamin Jun and Paul Kocher. The intel random number generator. Technical report, Cryptography Research Inc., 1999.
[4] Michael Gude. Concept for a high performance random number generator based on physical random phenomena. Frequenz, 39:187, 1985.
[5] A. Figotin, I. Vitebskiy, V. Popovich, G. Stetsenko, S. Molchanov, A. Gordon, J. Quinn, and N. Stavrakas. Random number generator based on the spontaneous alpha-decay, Jun. 1, 2004. U.S. Pat. No. 6,745,217.
[6] M. Stipcevic and B. Medved Rogina. Quantum random number generator based on photonic emission in semiconductors. Rev. Sci. Instrum., 78:045104, 2007.
[7] Michael A. Wayne, Evan R. Jeffrey, Gleb M. Akselrod, and Paul G. Kwiat. Photon arrival time quantum random number generation. Journal of Modern Optics, 56(4):516-522, 2009.
[8] Martin Fürst, Henning Weier, Sebastian Nauerth, Davide G. Marangon, Christian Kurtsiefer, and Harald Weinfurter. High speed optical quantum random number generation. Optics Express, 18(12):13029, 2010.
[9] Michael A. Wayne and Paul G. Kwiat. Low-bias high-speed quantum random number generator via shaped optical pulses. Opt. Express, 18(9):9351-9357, April 2010.
[10] Michael Wahl, Matthias Leifgen, Michael Berlin, Tino Roĭ Lhlicke, Hans-Juĭ Lrgen Rahn, and Oliver Benson. An ul-trafast quantum random number generator with provably bounded output bias based on photon arrival time measurements. Applied Physics Letters, 98(17): 171105, 2011.
[11] You-Qi Nie, Hong-Fei Zhang, Zhen Zhang, Jian Wang, Xiongfeng Ma, Jun Zhang, and Jian-Wei Pan. Practical and fast quantum random number generation based on photon arrival time relative to external reference. Applied Physics Letters, 104(5):051110, February 2014.
[12] Min Ren, E Wu, Yan Liang, Yi Jian, Guang Wu, and Heping Zeng. Quantum random-number generator based on a photon-number-resolving detector. Physical Review A, 83(2):023820, February 2011.
[13] Daniela Frauchiger and Renato Renner. Truly random number generation: an example. Proc. SPIE, 8899: 88990S-88990S-7, 2013.
[14] Caitlin R. S. Williams, Julia C. Salevan, Xiaowen Li, Rajarshi Roy, and Thomas E. Murphy. Fast physical random number generator using amplified spontaneous emission. Optics Express, 18(23):23584, October 2010.
[15] Ido Kanter, Yaara Aviad, Igor Reidler, Elad Cohen, and Michael Rosenbluh. An optical ultrafast random bit generator. Nature Photon, 4, 5861 (2009)
[16] Bruno Sanguinetti, Anthony Martin, Hugo Zbinden, and Nicolas Gisin. Quantum random number generation on a mobile phone. Phys. Rev. X, 4:031056, September 2014.
[17] You-Qi Nie, Leilei Huang, Yang Liu, Frank Payne, Jun Zhang, and Jian-Wei Pan. The generation of 68 Gbps quantum random number by measuring laser phase fluctuations. Review of Scientific Instruments, 86(6):063105, June 2015.
[18] Bing Qi, Yue-Meng Chi, Hoi-Kwong Lo, and Li Qian. High-speed quantum random number generation by measuring phase noise of a single-mode laser. Opt. Lett., 35(3):312, January 2010.
[19] Feihu Xu, Bing Qi, Xiongfeng Ma, He Xu, Haoxuan Zheng, and Hoi-Kwong Lo. Ultrafast quantum random number generation based on quantum phase fluctuations. Optics Express, 20(11):12366, May 2012.
[20] C. Abellán, W. Amaya, M. Jofre, M. Curty, A. Acisn, J. Capmany, V. Pruneri, and M. W. Mitchell. Ultra-fast quantum randomness generation by accelerated phase diffusion in a pulsed laser diode. Optics Express, 22(2): 1645, 2014.
[21] Carlos Abellán, Waldimar Amaya, Daniel Mitrani, Valerio Pruneri, and Morgan W. Mitchell. Generation of fresh and pure random numbers for loophole-free bell tests. Phys. Rev. Lett., 115:250403, December 2015.
[22] Z. L. Yuan, M. Lucamarini, J. F. Dynes, B. Frohlich, A. Plews, and A. J. Shields. Robust random number generation using steady-state emission of gain-switched laser diodes. Applied Physics Letters, 104(26):261112, June 2014.
[23] Hongyi Zhou, Xiao Yuan, and Xiongfeng Ma. Randomness generation based on spontaneous emissions of lasers. Physical Review A, 91(6):062316, June 2015.
[24] M. Jofre, M. Curty, F. Steinlechner, G. Anzolin, J. P. Torres, M. W. Mitchell, and V. Pruneri. True random numbers from amplified quantum vacuum. Optics Express, 19(21):20665, October 2011.
[25] Christian Gabriel, Christoffer Wittmann, Denis Sych, Ruifang Dong, Wolfgang Mauerer, Ulrik L. Andersen, Christoph Marquardt, and Gerd Leuchs. A generator for unique quantum random numbers based on vacuum states. Nature Photon, 4, 711715 (2010).
[26]. T. Symul, S. M. Assad, and P. K. Lam. Real time demonstration of high bitrate quantum random number generation with coherent laser light. Applied Physics Letters, 98(23):-, 2011.
[27]. Yong Shen, Liang Tian, and Hongxin Zou. Practical quantum random number generator based on measuring the shot noise of vacuum states. Physical Review A, 81(6):063814, June 2010.
[28]. Yicheng Shi, Brenda Chng, and Christian Kurtsiefer. Random numbers from vacuum fluctuations. Applied Physics Letters, 109(4):041101, July 2016.
[29]. Hugo Krawczyk. Lfsr-based hashing and authentication. Advances in Cryptology, CRYPTO 94, 129139, 1994.
[30]. Andrew Rukhin, Juan Soto, James Nechvatal, Miles Smid, Elaine Barker, Stefan Leigh, Mark Levenson, Mark Vangel, David Banks, Alan Heckert, James Dray, and San Vo. A Statistical Test Suite for Random and Pseudorandom Number Generators for Cryptographic Applications. National Institute of Standards and Technology, April 2010.
[31]. David Bauer Robert G. Brown, Dirk Eddelbuettel. Dieharder: A random number test suite, 2004.
[32] R. J. Glauber: "Coherent and Incoherent States of the Radiation Field", Phys. Rev. 131, 2766-2788 (1963).
[33] H. P. Yuen and V. W. S Chan: "Noise in homodyne and heterodyne detection", Optics Letters 8, 177-179 (1983).
[34] E. Jakeman et al: "Optical homodyne detection", Advances in Physics 24, 349 (1975).

The invention claimed is:

1. A method for random number generation, the method comprising the steps of:
generating a first electromagnetic field having a mode with a wave front in free space;
exposing first and second photodetectors directly to the mode of the first electromagnetic field with the wave front in free space in the presence of a mode in a vacuum state of a second electromagnetic field, for splitting the wave front between the first and second photodetectors such that an illumination of the first and second photodetectors is at least substantially balanced; and generating a random noise signal based on a photocurrent difference between the first and second photodetectors.

2. The method of claim 1, wherein generating the random noise signal comprises performing an analogue to digital conversion of the photocurrent difference.

3. The method of claim 2, wherein generating the random noise signal further comprises applying a randomness extraction process to the digitally converted photocurrent difference.

4. The method of claim 3, further comprising selecting an extraction ratio of the randomness extraction process to account for a deviation from an ideal balance of the illumination of the first and second photodetectors and a noise contribution due to noise sources not of quantum origin.

5. A system for random number generation comprising:
first and second photodetectors;
a source for generating a first electromagnetic field having a mode with a wave front in free space; and
means for generating a random noise signal based on a photocurrent difference between the first and second photodetectors;

wherein the first and second photodetectors and the source are disposed such that the first and second photodetectors are directly exposable to the mode of the first electromagnetic field with the wave front in free space in the presence of a mode in a vacuum state of a second electromagnetic field, for splitting the wave front between the first and second photodetectors such that an illumination of the first and second photodetectors is at least substantially balanced.

6. The system of claim 5, wherein the means for generating the random noise signal is configured for performing an analogue to digital conversion of the photocurrent difference.

7. The system of claim 6, wherein the means for generating the random noise signal is further configured for applying a randomness extraction process to the digitally converted photocurrent difference.

8. The system of claim 7, wherein the means for generating the random noise signal is configured for selecting an extraction ratio of the randomness extraction process to account for a deviation from an ideal balance of the illumination of the first and second photodetectors and a noise contribution due to noise sources not of quantum origin.

9. The system of claim 5, wherein the first and second photodetectors and the source are disposed in a light tight housing or package.

* * * * *